W. P. KENNEDY.
WEIGHING ATTACHMENT FOR REFRIGERATORS.
APPLICATION FILED SEPT. 19, 1910.

993,836.

Patented May 30, 1911.

2 SHEETS—SHEET 1.

Witnesses
J. T. L. Wright
Thos. A. Connolly

Inventor
W. P. Kennedy
By
Attorney

W. P. KENNEDY.
WEIGHING ATTACHMENT FOR REFRIGERATORS.
APPLICATION FILED SEPT. 19, 1910.
993,836.
Patented May 30, 1911.
2 SHEETS—SHEET 2.
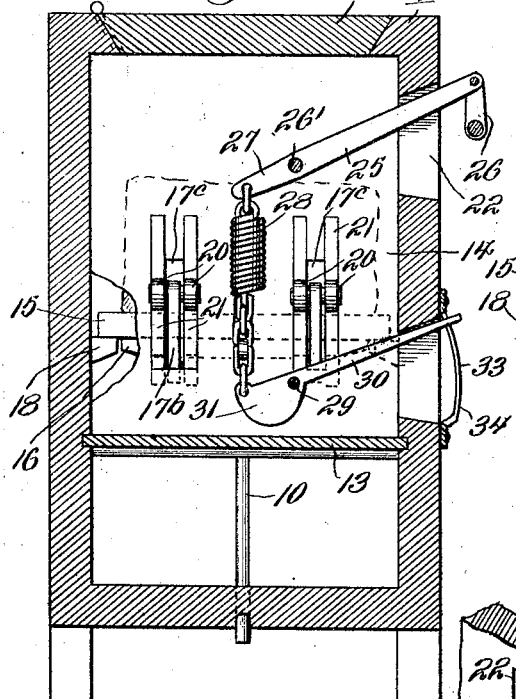
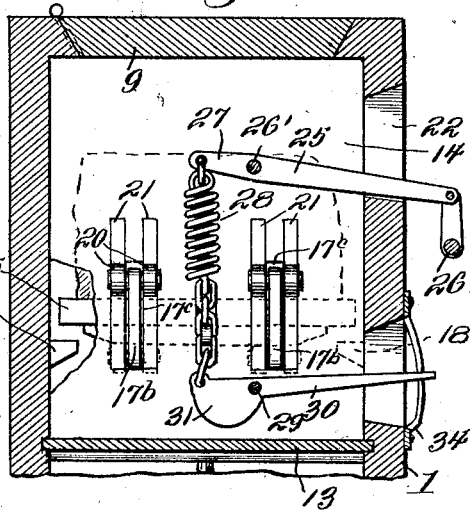
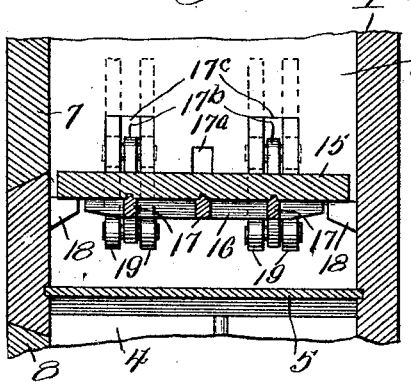
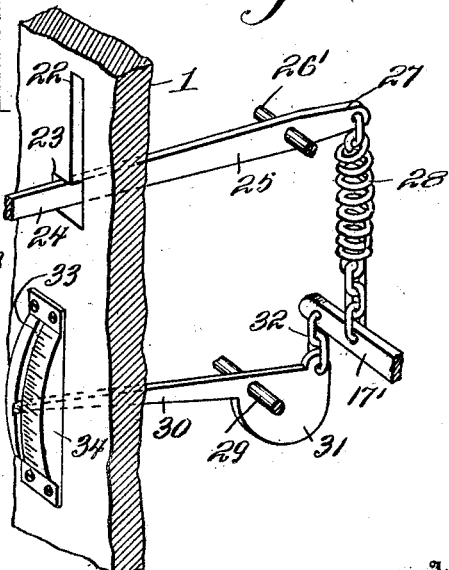
Witnesses:
J. L. Wright
Thos. A. Connolly
Inventor:
W. P. Kennedy,
By
Attorney.

UNITED STATES PATENT OFFICE.

WALLACE P. KENNEDY, OF RICHMOND, VIRGINIA.

WEIGHING ATTACHMENT FOR REFRIGERATORS.

993,836.  Specification of Letters Patent.  Patented May 30, 1911.

Application filed September 19, 1910. Serial No. 582,648.

*To all whom it may concern:*

Be it known that I, WALLACE P. KENNEDY, a citizen of the United States, residing at Richmond, in the county of Henrico and State of Virginia, have invented certain new and useful Improvements in Weighing Attachments for Refrigerators, of which the following is a specification.

This invention relates to a weighing attachment for refrigerators whereby the amount of ice, in numbers of pounds, contained within the refrigerator may be ascertained at any time.

The primary object of the invention is to provide a weighing attachment for refrigerators in which the balancing and indicating devices of the weighing mechanism are normally inoperative with relation to the scale-platform or ice-support, whereby said mechanism will be relieved from the strain of supporting the ice except when its use is desired to indicate the weight of the contained ice, and also relieved from the shocks and jars resulting from the deposit of ice upon the platform, thereby obviating liability of derangement of or injury to said weighing mechanism.

Further objects of the invention are to provide means for throwing the weighing mechanism into and out of action at will; to provide a comparatively simple and inexpensive construction of weighing mechanism which is compact and reliable and applicable to existing types of refrigerators; and to provide a weighing mechanism in which the platform is effectually guided and prevented from binding or hanging in its movements.

The invention consists of the features of construction, combination and arrangement of parts, hereinafter fully described and claimed, reference being had to the accompanying drawings, in which:—

Figure 1:
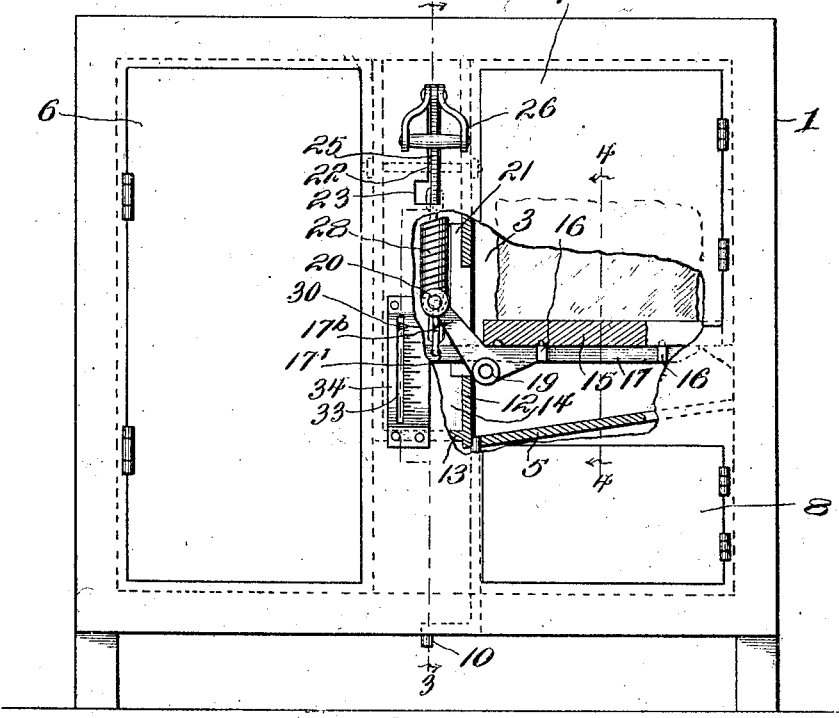
Figure 2:
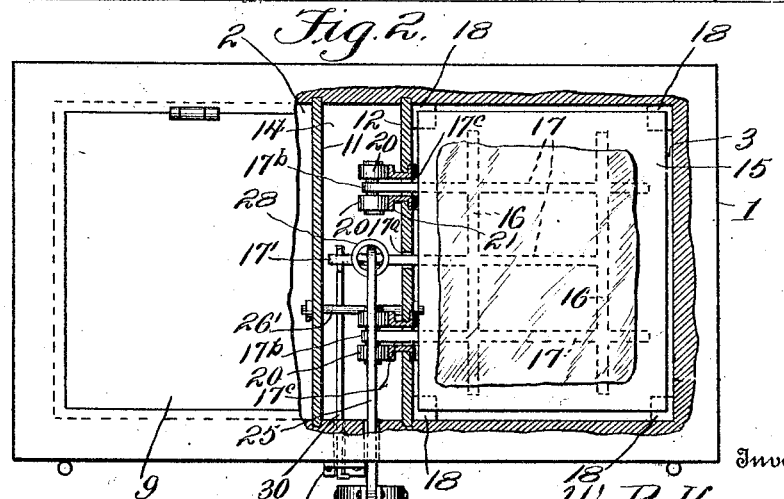

Figure 1 is a front elevation, with parts broken away and in section, of a refrigerator embodying my invention, the mechanism being in normal position. Fig. 2 is a top plan view of the same, with parts broken away and appearing in horizontal section. Fig. 3 is a vertical front-to-rear section with the parts of the weighing mechanism shown as in Figs. 1 and 2. Fig. 4 is a detail section on the line 4—4 of Fig. 1. Fig. 5 is a view similar to Fig. 3, showing the weighing mechanism set for operation. Fig. 6 is a perspective view of parts of the weighing mechanism.

Referring to the drawings, 1 designates the refrigerator box or casing, which is shown in the present instance as provided on one side of its center with a storage compartment 2 and on the opposite side of its center with an ice chamber 3 and a storage compartment 4, which chamber and compartment are separated by a partition 5. Doors 6, 7 and 8 are respectively provided at the front of the casing to close the compartment 2, chamber 3 and compartment 4, and a door 9 is provided to close the tops of the said compartment 2 and chamber 3. A drain pipe 10 leads downwardly from the ice chamber for the discharge of the water from said chamber.

Formed between the compartment 2 and chamber 3 by vertical walls or partitions 11 and 12 and a horizontal wall or partition 13 is an inclosing space or chamber 14 for the reception and protection of the balancing devices and movable member of the indicator of the weighing mechanism. The scale platform of the weighing mechanism is mounted for vertical movement in the chamber 3 and preferably comprises a board 15 carried by a grid-like base frame composed of a series of crossed bars 16 and 17, the inner end of the central bar of the series 17 being provided with an extended portion 17′ vertically movable in a guide slot 17ª in the wall 12 and projecting into the chamber 14. The outer bars of the series 17 have arms 17ᵇ bent upwardly and outwardly at an angle, which arms also extend into the chamber 14 and are movable vertically in guide slots 17ᶜ formed in the wall 12.

Arranged at the limit of downward movement of the platform are cushioning stops or supports 18, said stops being located at the corners of the chamber 3. These stops may be made of any suitable cushioning material and are adapted to relieve the platform of all shocks and jars in its movements, as well as from possible injury when ice is dumped into the chamber. Rollers 19 are journaled at the lower ends of the arms 17ᵇ to run in contact with the inner surface of the wall 12 on opposite sides of the slots 17ᶜ, and rollers 20 are journaled upon the upper ends of said arms to run upon track flanges 21 arranged on the outer face of said wall at opposite sides of said slots. These rollers permit free and easy vertical movement of the platform and by their arrangement prevent the platform tilting or canting, whereby the platform is guided and supported to maintain a true horizontal position and binding of said platform obviated.

Formed in the front wall of the refrigerator casing is a vertical slot 22 laterally enlarged at its lower end to provide a catch shoulder 23. Extending through said slot is the free end of the front or operating portion 24 of a scale arm or lever 25, which end of said lever is provided with an operating handle 26. The said lever is carried by a pivot pin or axle 26′, and from its opposite or rear portion 27 is suspended a coiled suspension spring 28 having a determined resistance to expansion, said spring being connected at its lower end with the rod extension 17′. The lever and spring constitute a spring balance for the platform which is controllable, through movements of the lever, to relax the spring to throw the weighing mechanism out of action, and to tension the spring to throw said mechanism into action. Below the axle 26′ is arranged an axle 29 carrying a swinging indicator hand or pointer 30 having a weighted rear end 31 connected with the rod extension 17′ by a chain or other flexible connection 32. The front end of this hand or pointer works in a slot 33 in a graduated scale plate 34, secured to the front wall of the refrigerator casing. The scale graduations on this plate extend upwardly, the zero point being adjacent the lower end of the slot and the highest graduation adjacent the upper end of the slot.

The operation is as follows: Under all normal conditions the scale platform rests upon the cushioning supports, the scale arm is unlatched, the spring is relaxed, and the pointer is held by its weighted end with its free end at the top of the slot in the indicator plate, whereby all the weight of the platform and its load, if any, is relieved from the spring. The relaxation of the spring causes the rear end of the lever arm to be drawn downward thereby, the front end of said arm being swung upward into the upper end of the guide slot. The weight of the contained ice may now be ascertained at any time by pulling down on the handle 26 until the front end of the lever arm is drawn under the shoulder 23. As a result, the rear end of the lever will be elevated, thus tensioning the spring until it is expanded to a sufficient degree to elevate the platform and load. The elevation of the platform causes an upward pull on the weighted end of the pointer, the free end of which will accordingly swing downward to the proper extent in the slot in the scale plate and indicate the exact weight of the load. In this manner any amount of ice up to the full capacity of the ice chamber and scale may be measured, to ascertain the exact quantity of ice contained in the refrigerator. Having determined the number of pounds of ice in the ice chamber, the user may call for the additional amount desired and, if there should be any shortage, the amount of such shortage will be apparent.

From the foregoing description, the construction and mode of use of my improved weighing apparatus will be apparent and its advantages appreciated without further detailed description.

Variations in the structure and relation of parts and the use of equivalents may, of course, be made within the spirit and scope of the appended claims.

I claim:—

1. In a weighing attachment for refrigerators, the combination of a refrigerator having an ice chamber, a scale platform vertically movable therein, an intermediately pivoted lever, a balancing spring connecting one end of said lever with said platform, said spring being normally slack, a handle connected with the other end of the lever for adjusting said lever to tension said spring, means for locking the lever in spring tensioning position, a scale plate, a pivoted automatically retracted indicator hand coöperating therewith, and a flexible connection between said indicator hand and the scale platform.

2. In a weighing attachment for refrigerators, the combination of a refrigerator having an ice chamber, a scale platform vertically movable therein, a scale arm embodying an intermediately pivoted lever, a balancing spring suspended from one end of said lever, said lever being normally free for movement and said spring forming a slack connection between the lever and the platform, a handle connected with the other end of the lever for swinging said lever to a position to tension the spring, means for locking said lever in such position, and suitable indicating means.

3. In a weighing attachment for refrigerators, the combination of a refrigerator having an ice chamber provided with supporting means, a scale platform movable vertically in said chamber and adapted to rest on said supporting means, an intermediately pivoted lever, a spring connected with one end of the lever and the platform, a handle connected with the opposite end of the lever whereby the latter may be adjusted to tension the spring, means for locking the lever in adjusted position, a scale plate, a pivoted pointer having a weighted end for normally maintaining it in non-indicating position, and a flexible connection between the platform and weighted end of the pointer.

4. In a weighing attachment for refrigerators, the combination of a refrigerator having an ice chamber, one of the walls of which is provided with a guide slot, a scale platform vertically movable in said chamber, an arm extending therefrom through said slot, an intermediately pivoted lever, a balance spring connecting one end of said lever with said arm, a handle connected with the opposite end of the lever to tilt the same and place said spring under tension, a locking member upon the refrigerator, to hold the lever in tilted position, a scale plate, a pivoted, weighted automatically retracted pointer coöperating therewith, and a flexible connection between said pointer and the arm.

5. In a weighing attachment for refrigerators, the combination of a refrigerator having an ice chamber, one of the walls of which is provided with guide slots, a scale platform movable vertically in said chamber, an arm connected with the platform and extending through one of said guide slots, cushioning stops to support the platform in normal position, arms extending outwardly at an upward angle from the platform through the other slots in the wall, rollers upon said arms bearing against the inner and outer surfaces of the wall on opposite sides of said slots, an intermediately pivoted lever, a balancing spring connecting the one end of said lever with the first named arm extending from the scale platform, a handle connected with the opposite end of the lever to tilt the same and place said spring under tension, a lock to hold the lever in tilted position, a scale plate, a pivoted, automatically retracted pointer coöperating therewith, and a connection between said pointer and the scale platform.

6. In a weighing attachment for refrigerators, the combination of a refrigerator having an ice chamber, one of the walls of which is provided with guide slots, a scale platform movable vertically in said chamber, an arm connected with the platform and extending through one of said guide slots, cushioning stops to support the platform in normal position, arms extending outwardly at an upward angle from the platform through the other slots in the wall, rollers upon said arms bearing against the inner and outer surfaces of the wall on opposite sides of said slots, an intermediately pivoted lever, a balancing spring connecting the one end of said lever with the first named arm extending from the scale platform, a handle connected with the opposite end of the lever to tilt the same and place said spring under tension, a lock to hold the lever in tilted position, a scale plate, a pivoted, automatically retracted pointer coöperating therewith, and a connection between said pointer and the scale platform.

In testimony whereof I affix my signature in presence of two witnesses.

WALLACE P. KENNEDY.

Witnesses:
MARY C. DALTON,
L. C. HAZELGROVE.